United States Patent [19]

Combridge et al.

[11] Patent Number: 5,067,015
[45] Date of Patent: Nov. 19, 1991

[54] METHOD OF PROCESSING VIDEO IMAGE DATA FOR USE IN THE STORAGE OR TRANSMISSION OF MOVING DIGITAL IMAGES

[75] Inventors: Brian L. Combridge; David Robson; Daniel R. E. Timson, all of Stevenage, United Kingdom

[73] Assignee: British Aerospace Public Limited Company, London, England

[21] Appl. No.: 539,814

[22] Filed: Jun. 18, 1990

[30] Foreign Application Priority Data

Jun. 28, 1989 [GB] United Kingdom ............... 8914843

[51] Int. Cl.$^5$ .............................................. H04N 7/13
[52] U.S. Cl. ..................................... 358/133; 358/136
[58] Field of Search ................................. 358/133, 136

[56] References Cited

U.S. PATENT DOCUMENTS 4,222,076 9/1980 Knowlton ..................... 358/133

FOREIGN PATENT DOCUMENTS 0293041 11/1988 European Pat. Off. .

OTHER PUBLICATIONS

IEEE Trans. on Communication, COM-31 (4), Apr. 1983, pp. 532-540.

Primary Examiner—Howard W. Britton
Attorney, Agent, or Firm—Cushman, Darby & Cushman

[57] ABSTRACT

A method of processing video image data for use in the storage or transmission of moving digital video images, includes decomposition of each frame image into an equivalent set of sub-images containing information on different length scales, derivation of encoded prediction rules from the decomposed data to approximate each sub-image using data from the immediately preceding compressed sub-image and data from the current sub-image to produce compressed data of an image for subsequent storage or transmission to a receiver and reconstruction, after retrieval or receipt, by comparison of the compressed data received for the current frame image with the reconstruction of the preceding frame image.

15 Claims, 6 Drawing Sheets

METHOD OF PROCESSING VIDEO IMAGE DATA FOR USE IN THE STORAGE OR TRANSMISSION OF MOVING DIGITAL IMAGES

FIELD OF THE INVENTION

This invention relates to a method of processing video image data for use in the storage or transmission of moving digital video images, and is particularly, but not exclusively, concerned with the processing of such images for use in space and/or terrestrial systems.

BACKGROUND OF THE INVENTION

Video image standards for spatial and temporal resolution are based mainly on an acceptable picture quality for human observers. These video images contain extremely large amounts of information (approximately 100 Mbits/sec for moving digital video images) and require very large bandwidths. This necessitates the use of costly communication channels for transmission with consequent increase of pressure and demand on available communication bandwidths in both space and terrestrial systems. Additionally the storage of such large amounts of information requires the use of costly, large and heavy storage means.

It has previously been proposed to reduce the amount of data transmitted by making use of the fact that a proportion of the data necessary for each successive frame of a moving picture is common to adjacent frames and need not be transmitted for each frame. Such redundant data can be eliminated and conventionally this is done by image compression techniques which utilize combinations of established methods such as predictive, transform, conditional replenishment and vector quantisation algorithms.

These proposed image compression techniques all suffer from various drawbacks. For example a proposed hybrid coding technique using motion compensated prediction followed by a discrete cosine transform on the prediction errors results in degradations such as block busyness, low resolution of moving areas, and difficulty in disguising the artefacts of the algorithm used.

OBJECTS OF THE INVENTION

Thus one object of the invention is to provide a generally improved method of processing video image data for use in the storage or transmission of moving digital video images which reduces the amount of data which it is necessary to store or transmit, and hence reduces the load on the communication channel or storage means, whilst resulting in a received video image or picture of a quality acceptable to a human observer.

Another object of the present invention is to provide a method of processing video image data for use in the storage or transmission of moving digital data which avoids block busyness problems whilst providing acceptable resolution of moving areas.

These and other objects and advantages of the present invention will become more apparent from details disclosed in the following specification where preferred embodiments of the invention are described.

SUMMARY OF THE INVENTION

According to one aspect of the present invention there is provided a method of processing video image data for use in the storage or transmission of moving digital video images, in which each frame image is decomposed into an equivalent set of sub-images containing information on different length scales, encoded prediction rules are derived from the decomposed data to approximate each sub-image using data from the immediately preceding compressed sub-image and data from the current sub-image to produce compressed data of an image for subsequent storage or transmission to a receiver and reconstruction, after retrieval or receipt, by comparison of the compressed data received for the current frame image with the reconstruction of the preceding frame image.

According to another aspect of the present invention there is provided a method of processing video image data for use in the storage or transmission of moving digital video images, including the steps of examining a current frame image, sub-band decomposing the current frame image by bandpass filtering to produce a set of sub-images, dividing each sub-image in the current frame image set into a plurality of blocks, comparing the blocks for each sub-image in the current frame image set with blocks in the approximation of the corresponding sub-image in the preceding frame image set for similarities and variations in position and illumination intensity, generating for each block of each sub-image of the current frame image set a prediction rule and errors resulting therefrom to produce for each sub-image of the current frame image partially compressed data which is the sum of the predicted sub-image and corresponding error image, and further compressing the partially compressed data for each sub-image of the current frame image by encoding to produce fully compressed current frame image data, for subsequent passage or transmission to storage or a receiver and reconstruction of the retrieved or received fully compressed current frame image data.

Advantageously sub-band decomposition is an iterative operation carried out more than once, with each successive bandpass sub-image being generated at each iteration and containing information from the upper half of the remaining spatial frequency spectrum in each dimension.

Preferably the set of bandpass sub-images is completed by a final lowpass sub-image containing information from the whole of the remaining spatial frequency spectra.

Conveniently the first bandpass sub-image has the same number of pixels as the current frame image, with each successive sub-image being sub-sampled by a factor of two in each dimension relative to the previous sub-image.

Preferably in the method, before subsequent processing, the sub-band decomposition is exactly invertible so that the current frame image is recoverable without error from the set of sub-images.

Advantageously the method includes the step of quantizing the pixel values of the sub-images.

Preferably the prediction rule for each block of each sub-image of the current frame image involves 'stationary match' in which a block is sufficiently similar to the spatially coincident block in the approximation of the corresponding preceding frame sub-image or 'displaced match' in which a block is sufficiently similar to a block displaced from the spatially coincident block in the approximation of the corresponding preceding frame sub-image or 'mean value' in which the pixel values of a block are estimated by the average of those values or 'intraframe' in which each pixel value in a block is estimated on the basis of the approximations of neighbouring pixel values in the current frame sub-image.

Conveniently the prediction rule for each block of each sub-image of the current frame image includes predictions for the pixel values of the block in the form of the spatially coincident values from the approximation of the corresponding preceding frame sub-image or the appropriately displaced values or the average of the pixel values in the current frame sub-image block or the interpolations of the approximation for neighbouring pixel values in the current frame sub-image.

Advantageously the errors for each block of each sub-image of the current frame image are the differences between the pixel values of the actual and predicted current frame sub-image block.

Preferably before encoding the errors are processed by quantisation, deletion of spatially isolated non-zero values and/or random deletion of non-zero values, further to increase the data compression effect resulting from subsequent encoding.

Conveniently prior to passage or transmission of fully compressed current frame image data to storage or to a receiver, the total number of bits of fully compressed data is counted, and if the total number falls outside a predetermined range, the total number of bits of the fully compressed data for the next current frame image is varied accordingly.

Advantageously the method includes the steps of passage or transmission of fully compressed current frame image data to storage or a receiver, and reconstruction of the retrieved or received fully compressed current frame image data, in which reconstruction the prediction rules and processed error images are decoded, the approximations to each of the sub-images are recovered and the sub-band decomposition of the original current frame image is inverted.

Preferably the approximations to each of the sub-images are recovered by applying the prediction rules to the corresponding approximations recovered for the immediately preceding frame image and adding the respective error image pixel values thereto.

Conveniently the sub-band decomposition is inverted by increasing the number of pixels in the recovered low pass sub-image by a factor of two in each dimension, adding the pixel values of the smallest recovered band-pass sub-image to produce an approximation to the lowpass image for that level, and repeating said increasing and adding steps for each consecutive level in the current frame image sub-band decomposition until an approximation of the original current frame image is produced.

For a better understanding of the present invention and to show how the same may be carried into effect, reference will now be made, by way of example, to the accompanying drawings, in which:

DESCRIPTION OF EMBODIMENTS OF THE INVENTION

A method according to the present invention for processing video image data for use in the storage or transmission of moving digital video images, as illustrated in the accompanying drawings, involves the use of an algorithm for reducing by orders of magnitude the high raw data rates associated with digital image sequences while retaining acceptable image quality when the sequences are reconstructed.

In the method of the invention this is done by decomposing the original image into a set of sub-images that are related to the original on different resolution scales. The human visual system has different sensitivities to each of these sub-images since they contain different spatial frequencies and the coding of each sub-image can exploit this sensitivity. The data compression is obtained through the coding, rather than in the decomposition which does not provide any inherent compression but has instead yielded an attractive basis for the coding. The reason for this is that the sub-bands have a significantly lower variance than the original so that they can be quantised at a reduced number of levels, whilst also providing a convenient domain for performing the required interframe predictions.

The decomposition is performed by repetitive convolution of the image with a low pass filter. The high spatial frequencies are attenuated after each filtering operation, so the filtered image can be sub-sampled by a factor of two in both horizontal and vertical directions to give a decimated image. The new image can itself be filtered and the process of reduction can be iterated. Using the filtered images for further processing leads to an efficient scheme for computing lower frequency bands.

Figure 2:
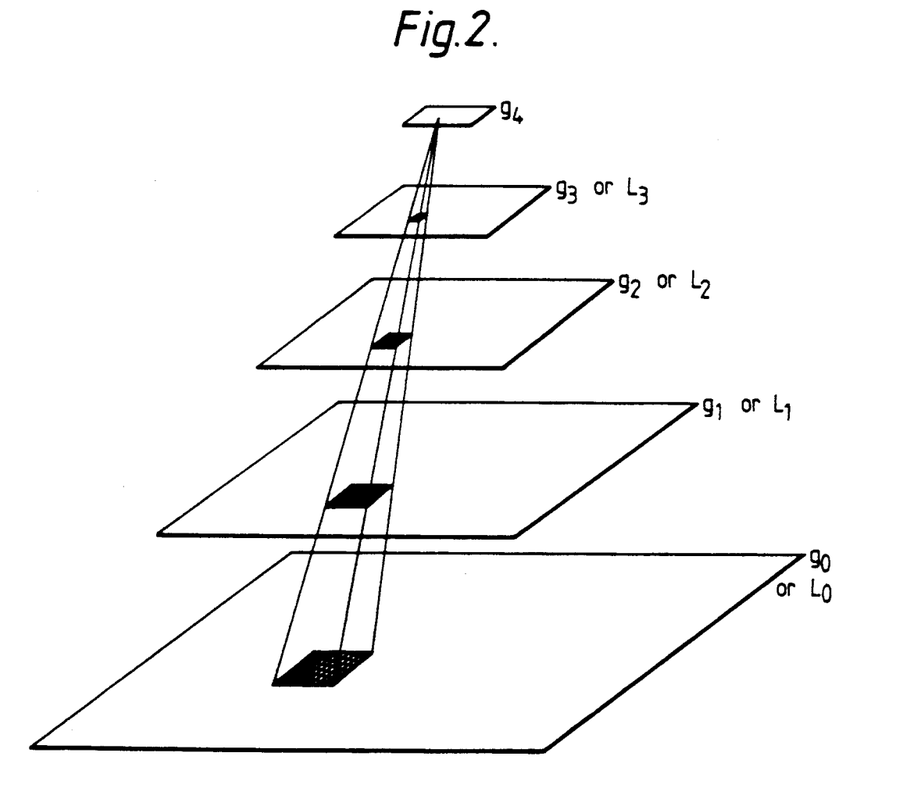
FIG. 2 is a diagrammatic representation of a connection pyramid showing related pixels in different sub-images as used in a compression algorithm according to the method of the invention.

The lowpass filter operation may be viewed as computing the local weighted average value of each pixel element. Iterative sub-band generation is equivalent to convolving the image with a set of equivalent weighting functions, which rapidly converge to a characteristic form after repeated convolutions. For an appropriate choice of the convolutional kernel, the characteristic form will take a Gaussian-like shape, giving the name of a Gaussian pyramid representation of the image as shown in FIG. 2. Any level on the pyramid could be obtained by convolving the original image with the equivalent weighting function for that level. However this is less computationally efficient than the iterative process.

Given a set of lowpass filtered images on the Gaussian pyramid, bandpass images can be constructed by taking the difference between adjacent planes of the pyramid. Since the sample density is not the same on adjacent planes, pixel by pixel subtraction is not possible. Therefore it is necessary to interpolate new samples using weighting functions in the less dense image prior to taking the difference. These bandpass images are referred to as Laplacian images, since the operation of finding the difference between adjacent planes of the Gaussian pyramid is similar to the "Laplacian" operators used in image enhancement.

To illustrate this process, consider the simple image which can first be broken down into a series of successive lowpass sub-images providing a representation of the original on varying scales. Bandpass sub-images are then formed by taking the difference between adjacent lowpass sub-images so that they provide a crude edge description of the original on varying resolution scales. Much of the pixel to pixel correlation has been removed from the bandpass images, and they can be quantised on a coarser scale than the original.

The original image can be reversibly encoded by taking the Gaussian image from a certain plane of the pyramid of FIG. 2, together with the set of Laplacian images from all the planes below it on the pyramid. The process of filtering, decimation, interpolation and then subtracting to form a bandpass image at each level guarantees that aliasing components introduced by the decimation shall cancel when the bandpass components are recombined. Thus the encoding can be made reversible with no loss of information.

Representing the image by one Gaussian and a set of Laplacian images can give a very efficient code because the Gaussian has a greatly reduced sample density, whilst the Laplacian images are largely decorrelated and may be represented pixel by pixel with many fewer bits.

The next stage in the compression algorithm is the coding of the sub-band images to remove the temporal redundancy in a sequence of images. The decomposition is performed on each frame of a video sequence. Each of the sub-bands is then coded using an adaptive predictor based upon a stationary interframe rule, displaced interframe rule or additionally, in the case of the final (low-pass) sub-band image, an intraframe rule or average value rule. Since the information content of each of the sub-bands is not completely independent, a prediction rule in one sub-band may be used as input for the prediction rules for all the pixels in the local connection pyramid as illustrated in FIG. 2. Since the decomposition and the prediction are performed in the same spatial domain, the implementation is inherently simple. The adaption amongst the different prediction rules is determined by a control law based on the interframe activity in the sub-images, the success in mapping movements in the sub-images, and the prediction rules for corresponding locations in other levels of the pyramid. These features will be described in more detail hereinafter.

SUB-BAND DECOMPOSITION

Figure 3:
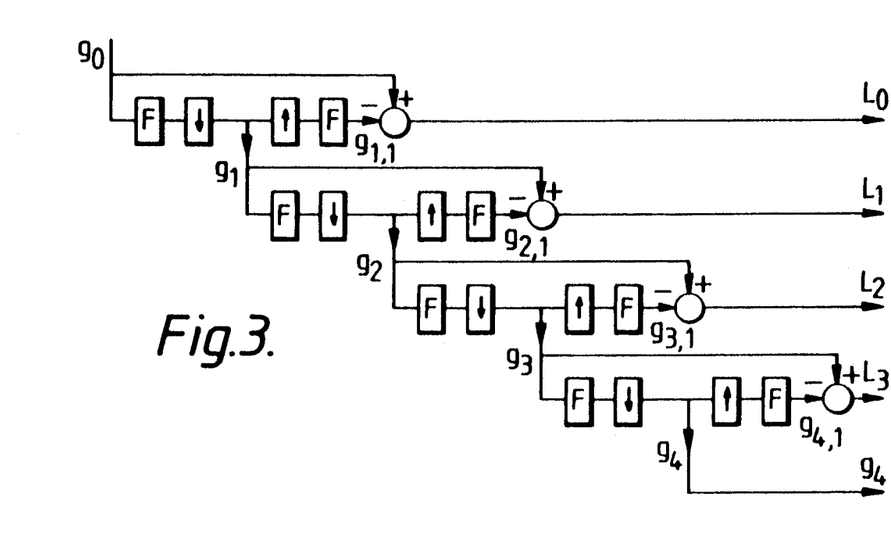
FIG. 3 is a block diagram representation of the sub-band decomposition of an image $g_o$ as utilised in the method of the invention.

Sub-band decomposition is a procedure in which a set of sub-images corresponding to contiguous spatial frequency bands is produced for each image in the image sequence using a nested pyramid of low pass filters and a bandpass filtering technique. Each successive bandpass sub-image (Laplacian) contains information from the upper half of the remaining spatial frequency spectrum in each dimension. The final lowpass sub-image (Gaussian) contains information from the whole of the remaining spectra. The first Laplacian has the same number of pixels as the original image. Each successive sub-image is sub-sampled by a factor of two in each dimension. The number of levels in the pyramid so formed may vary with the application. The bandpass filtering technique used allows the exact reconstruction of the original image from the set of sub-images by ensuring that aliasing effects cancel. From the set of lowpass filtered images, bandpass images can be constructed by taking the difference between adjacent lowpass sub-bands. Since the sample density is not the same, pixel by pixel subtraction is not possible, so it is necessary to interpolate new samples in the less dense image. The operation is shown schematically in FIG. 3 for decomposing a single image of size $R_o \times C_o$. Let $g_0$ be the original image, $g_r$ the image at the $r$th level of the lowpass pyramid, and $g_{r,1}$ the resulting image after interpolation and upsampling $g_r$ to the sampling density on level $r-1$. Then the filtering and decimation from level $r-1$ (image size $2R_r \times 2C_r$) to the next level r (image size $R_r \times C_r$) is given by:

$$g_r(i,j) = \sum_m \sum_n k(m,n) g_{r-1}(2i + m, 2j + n): 1 \leq i \leq R_r, 1 \leq j \leq C_r \quad (1)$$

and the equivalent interpolation and upsampling by:

$$g_{r,1}(i,j) = 4 \sum_m \sum_n k(m,n) g_r\left(\frac{i-m}{2}, \frac{j-n}{2}\right): \quad (2)$$

$$1 \leq i \leq 2R_r, 1 \leq j \leq 2C_r$$

In the latter expression only terms for which $(i-m)/2$ and $(j-n)/2$ are integers are included in the sum which is equivalent to padding the less dense image with zeros and then filtering the increased size image. Alternatively, nearest neighbour interpolation could be used. This requires the same number of unique multiplications as inserting zero samples and has been shown to be superior for noisy signals. The bandpass image at level $r-1$ is the difference between $g_{r-1}$ and $g_{r,1}$:

$$L_{r-1}(i,j) = g_{r,1}(i,j) \quad (3)$$

Figure 1:
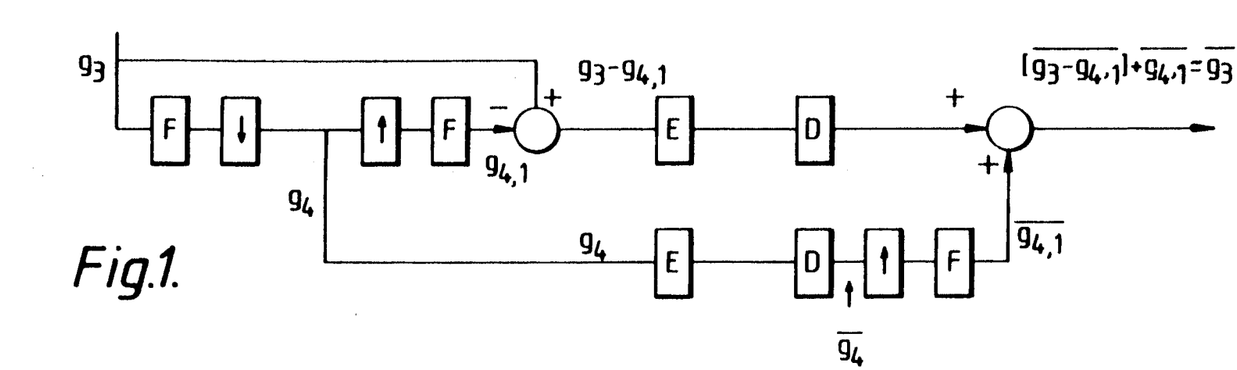
FIG. 1 is a schematic representation of a final sub-band decomposition step according to one embodiment of a method of the invention for compressing video image data for use in the storage or transmission of moving digital images.

The choice of the generating kernel, k(m,n), is set by the required characteristic form and the implementation to be chosen for this two dimensional FIR (finite impulse response) filter. Considering the simplified sub-band decomposition and reconstruction structure shown in FIG. 4, the final level is reproduced in FIG. 1.

In FIGS. 1, 3, 4, 5, 6 and 7, F represents a filtering operation, ↓ represents a decimation operation, ↑ represents an interpolation operation, E represents a quantising and encoding operation, D represents a decoding operation, and Q represents a quantising operation.

In the ideal case, decoding provides the exact inverse of encoding and the pyramid is completely reversible, independent of the type of filter. The original image can be recovered exactly since the aliasing distortions introduced by sub-sampling remain embedded in the sub-band images allowing exact cancellation upon image reconstruction. It should be noted that the same kernel is used throughout the pyramid only for convenience in producing a suitable implementation.

Filters employed should preferably be separable, symmetric and with each pixel contributing a uniform weight to the sub-image on the next level. The general trend with all filters is that the entropy (average information per pixel in bits) decreases for the sequence $g_0$, $g_1$, $g_2$..., whilst it increases for the sequence $L_0$, $L_1$, $L_2$... For an isolated image, it is not profitable to continue the decomposition when the entropy of the bandpass sub-band approaches that of the corresponding lowpass sub-band, which generally occurs around level 4 or 5 in the pyramid.

A large filter support reduces the frequency overlap between the sub-bands, suppresses the noise in the original image and rapidly decreases the entropy of the lowpass sub-bands. Smaller filter sizes yield lower activity in the bandpass sub-bands, allow better adaption to the local image features and minimise the computation requirement. The tradeoff does appear quite marginal and the best guide may be to reduce the complexity of the sub-band decomposition stages of the compressor, so that more processing power can be placed in the interframe coder. As a baseline the following kernels have been taken:

$$k(m,n) = w(m), w(n) \quad \text{with} \quad w(0) = \alpha \quad (4)$$
$$w(-1) = w(+1) = \tfrac{1}{4}$$
$$w(-2) = w(+2) = \tfrac{1}{4} - \alpha/2$$
$$\text{and} \quad \alpha \approx 0.4 - 0.6$$

A disadvantage of this sub-band decomposition is that it contains redundant information because the pyramid transform uses an over-complete set of non-orthogonal basis functions. If the size of $g_0$ is $n \times m$, then the size of the sub-band set $\{L_0, L_1, \ldots, L_{p-1}, g_p\}$ before encoding is:

$$\text{Set size} = mn + \frac{mn}{4} + \frac{mn}{16} + \ldots = \quad (5)$$

$$\frac{4mn}{3} (1 - 4^{-(p+1)}) \approx 1.332mn \text{ if } p = 4$$

Various methods can be used to yield sub-band sets with the same total number of pixels as the original. These may be based upon quadrature mirror filters which separate the image into four regions corresponding to high and low band signals in both the horizontal and vertical directions. Each sub-band can be decimated by a factor of $2 \times 2$ so that the total number of points in the four band decomposition is the same as the original image, before the process is repeated on the low-low band image. However this requires much more processing than simple sub-band decomposition because the quadrature mirror filter kernels are often larger than those proposed.

The high frequency sub-bands produced by quadrature mirror filters are decimated, thus folding the frequency axis about the lower band edge and interchanging high and low frequencies. The relationship between the original image and the sub-band images is not evident after this folding operation. The object of decomposition is to allow preferential encoding according to the perceived significance of the sub-band. If this is done correctly, quantisation and other effects will be masked according to the response of the human observer. If the importance of each sub-band to the image is not apparent then it is more difficult to prevent visible artefacts entering the reconstructed image. It is therefore preferred to work with the slightly increased data rate following use of a less complex filter.

Although the decomposition increases the total number of pixels (by up to one third, depending on the number of levels), its merits are:

i) Image information on different length scales is separated into different sub-images. This may have similarities with the processing performed by the human visual system (HVS) and is intended to allow the inevitable image degradation associated with high data compression ratios to be distributed amongst the different spatial frequency bands in such a way as to have least impact on the HVS.

ii) The Laplacian sub-images typically have low entropies (information content).

iii) Because the sub-images possess the spatial structure of the original image, scaled by an appropriate power of 2, motion detection and compensation between consecutive images can be implemented directly using the sub-images. This contrasts with other methods involving a spatial transform where an inverse transform has to be performed. Moreover, the simple spatial correspondences between sub-images allow motion information deduced in one level to be used as input (e.g.: starting point for a reduced search) to similar processing in another level.

The pixel values of the sub-images may be quantized to fewer than their original number of levels (fewer bits/pixel). Although this means that exact reconstruction of the original image is no longer guaranteed, such quantizations have the following advantages:

i) the fewer bits required for each pixel value require less processing and buffering resources.

ii) for the Laplacians in particular, non-uniform quantisation can be used to emphasise subtle features at the expense of unimportant differences in the strengths of stronger features.

Such quantizations may be adaptively controlled by the status of the output buffer of the compressor, although this would be secondary to the adaptive control of encoding.

PREDICTIVE CODING

For video sequences involving a considerable amount of activity or movement sophisticated interframe predictive coding techniques are necessary to maintain adequate quality in the reconstructed images. To achieve the required compression ratios, predictive coding using differential pulse code modulation (DPCM) is used on each of the sub-bands.

Fixed prediction rules give good performance for small compression ratios. However the picture statistics in general will be highly non-stationary and the prediction error can only be reduced by adapting to the local properties of the picture signal. Adaptive prediction reduces the range of possible prediction errors, hence the picture quality will be improved for a given compressed data rate.

It is evident that most natural image sequences can be segmented into changed and unchanged areas. The unchanged areas consist of stationary background with very small frame to frame differences, whereas the changed areas are caused by relative motion between the camera image plane and the subject. These areas must be treated differently from the unchanged areas with priority given to the smooth portrayal of motion. Simple protraction of the time domain (frame skipping) can often produce intolerable effects, so bandwidth compression must be achieved by reducing the spatial and interframe correlation.

High spatial frequencies that are moving cannot be resolved if the observer is gazing at a fixed point. However for normal television pictures the observer will generally attempt to follow moving areas of interest by continuous eye motion for low speeds or by saccadic motion at high speeds. Hence the requirements on spatial detail are reduced, but areas of uniform, well correlated motion must be preserved.

The problem of loss of detail in well correlated moving areas can be solved by detecting the direction and speed of the predominant motions in the scene. A limited number of vectors usually suffice to describe the salient areas of motion. Knowing the displacement vector it can be used to realise motion-compensated predictive coding. Motion detection algorithms can be roughly divided into two categories, block matching algorithms and recursive algorithms. Block matching is performed by searching for the maximum of the correlation between a block in the present frame and a displaced block in the previous frame. Recursive algorithms use an iterative estimate of the displacement vector based on the luminance gradients, the recursion is performed in the vertical, horizontal or temporal dimension. The latter generally gives a more accurate estimate of the displacement vector. However, for general purposes, only nearest pixel accuracy is required which can usually be guaranteed by the block matching method. If the displacement is a non-integer number of pixels, then an interpolation from the neighbouring pixels will often provide a better predictor than the closet displaced pixel.

Some information could be usefully passed from a video control panel to the video compression unit. Commands such as switching cameras, panning or zooming will have a direct impact on the interframe prediction. For instance, a switch camera command could initiate an overriding interrupt to use the average value/intraframe predictor (see below), instead of previous frame prediction, in the case of the final (low-pass) sub-image. Camera motion signals would assist the motion detection algorithm. The use of this control information, if available, should reduce the transient effects. For the purposes of the following description it is assumed that this information is not available for the compression unit.

A technique of adaptive interframe-intraframe predictive coding is used for the sub-bands. Several prediction rules are available for every pixel, the appropriate one is selected depending on the state of activity measures. For stationary areas, the interframe difference will be small and the best predictor function is the previously stored or transmitted frame. When the interframe activity measure rises above a threshold value, a block matching method is used to estimate the displacement or movement vector. If a high degree of confidence is placed on the outcome of this search, an interframe predictor based on the displaced pixel in the previously stored or transmitted frame is used. If a low degree of confidence is placed on the search, indicating areas containing rotations or erratic motion, areas of newly-revealed detail or a major change, then the previous frame is of little use and an intraframe or average value predictor may be used. The latter is particularly applicable to the final (low-pass) sub-image, where it will also compensate for sudden changes of scene or illumination. The system is not perfect but if the displacement vector compensation proves effective, its failings should be restricted to those areas where the observer is truly unable to perceive them.

The sub-band decomposition has several attractive features that can be exploited in a predictive coder, namely: Quantisation of each sub-band and the details of the adaptive predictive coding for each sub-band can be tuned for the statistics and visual importance of that band.

The sub-band predictors need not operate independently but can utilise information generated on other levels.

Predictive coding thus produces a set of rules and associated parameters for each sub-image by which the current sub-image can be 'predicted' using previously 'sent' (i.e.: transmitted or stored) data. For this purpose, copies of the 'sent' approximations of the preceding sub-images are stored at the compressor. In order that a variety of activity within the images can be accommodated, each sub-image is divided into a number of blocks for the predictive coding, and a prediction rule is generated for each block. The numbers of such blocks will be constrained by the data overheads generated by block-by-block change of prediction rule. The predictive coding strategy of the above discussion can then be realised as follows:

i) If the considered block is sufficiently similar to the spatially coincident block in the previously 'sent' corresponding sub-image, or if the block is most similar to the spatially coincident block when compared with a number of displaced blocks in a search area of the previously 'sent' corresponding sub-image, then the prediction is stationary match.

ii) Otherwise the prediction is displaced match, with the match being with the displaced block in the above search area which is most similar to the considered block in the current sub-image.

Thus far, the prediction rules are stationary match and displacement match and, for displacement match, there are associated parameters specifying the displacement. The predictions for the pixel values of the considered block are, respectively, the spatially coincident values from the previously 'sent' corresponding sub-image or the appropriately displaced values. Similarity of blocks is quantitatively assessed on the basis of their pixel values and 'sufficiently similar' indicates an appropriate threshold criterion on such an activity measure.

The approximation of the pixel values of the block is then given by combining the prediction with such indication of the errors of the prediction as the constraint on data volume permits.

The prediction rules may be elaborated, e.g.:

i) Stationary match may give way to displacement match only if the displacement match is significantly better (i.e.: the appropriate difference in activity measures exceeds some threshold).

ii) For the final lowpass sub-image, no satisfactory stationary or displacement match may be possible in the event of a sudden change of scene or illumination. In such a case, the preceding sub-image information may be disregarded, and two possible alternative prediction rules are:

a) mean value prediction. The mean of the pixel values in the considered block is the prediction for all the pixels, and this mean is the associated parameter for the rule.

b) intraframe prediction. The prediction for the value of a pixel in the considered block is interpolated from the already approximated values of neighbouring pixels in the current sub-image, including the indicated errors of prediction for the latter which will be included in the final compressed data.

iii) Instead of the spatially coincident block, stationary match may refer to a block in the previously 'sent' of the corresponding sub-image indicated by a displacement match search on a different level of the pyramid. This transfer of motion information can reduce the need for and scope of displacement match searches. The direction of motion information transfer will tend to be down the pyramid (towards $L_0$) since motion detection requires less processing for the small images higher in the pyramid.

The resulting data for the current image consists of a prediction rule, plus possible associated parameters, for each block of each sub-image, together with information on the errors resulting thereby. These errors may be envisaged as error images: the differences between the pixel values of the actual and predicted current sub-images. The constraint on data volume typically results in severe quantisation and/or selective editing of these error images.

The approximation to each sub-image of the current image which will be available to the reconstruction is then the sum of the predicted sub-image and the corresponding processed error image. It is also stored at the compressor for use in the predictive coding of the next image in the sequence.

The above considerations still provide considerable scope for parameter (and algorithm) choice. To give a more specific illustration, consider an image sequence with each image consisting of 256×256 pixels, sub-band decomposition up to $g_4$ and quantization of sub-image pixel values to 16 levels. Suitable block sizes are:

| | | |
|---|---|---|
| $L_0$ | 16 × 16 pixels | (256 blocks) |
| $L_1$ | 16 × 16 pixels | (64 blocks) |
| $L_2$ | 8 × 8 pixels | (64 blocks) |
| $L_3$ | 4 × 4 pixels | (64 blocks) |
| $g_4$ | 2 × 2 pixels | (64 blocks) | arranged so that individual blocks in $L_1$, $L_2$, $L_3$ and $g_4$ directly correspond with each other in the form of a connection pyramid together with squares of 4 blocks in $L_0$.

The criterion by which a stationary match (no change from preceding 'sent' sub-image) prediction will switch to motion prediction will be that the average absolute pixel value difference in a block exceeds a threshold of 1 level (in the quantised sub-images). If the threshold is exceeded, then a search for the best match, with slightly displaced blocks of pixels in the previous 'sent' sub-image, is undertaken using the same activity measure (i.e.: average absolute pixel value difference). If an improved match is not achieved, the prediction reverts to stationary match. For $g_4$ alone, if the measure for the best match exceeds a further threshold of 3 levels, the mean-value prediction rule is used. The error images are generated by comparing the predicted and actual sub-images and quantizing the differences to 3 levels (−2,0,2 in terms of quantized sub-image levels).

In the above, stationary match refers to matching with the spatially coincident block in the preceding 'sent' sub-image for $g_4$ and $L_3$. However for $L_0$, $L_1$ and $L_2$, the definition of stationary match will be a match with the block in the preceding 'sent' image indicated by the match achieved (stationary or displaced) in the next (higher) level in the pyramid. This implements the transfer of motion data down the pyramid starting from $L_3$. If required, motion prediction will be carried out about the 'stationary match' block with a maximum displacement of 3($g_4$), 7($L_3$) or 2($L_0$, $L_1$, $L_2$) pixels in each axis, giving a total of 48, 224 or 24 possible displacement vectors respectively.

For each of $L_0$, $L_1$, $L_2$, $L_3$ and $g_4$ the prediction rule data and the error image are sent to the output buffer (via an encoder) and the 'sent' sub-image (prediction plus quantised error) is stored for use in processing the next frame.

ENCODING

As described above, the data for each image in the sequence consists of prediction rules with associated parameters and error images. Considering the latter first, the number of pixels in the error images is the same as in the sub-images, which in total exceeds the number of pixels in the original image by up to a third. However, for suitably chosen prediction rules, the information content (entropy) of the error images is typically low with most pixel values close to or equal to zero. Standard, or other, encoding techniques can be employed to reduce substantially the number of bits required to specify the error images by taking advantage of the low information content. This compression can be further substantially increased by processing the error images before encoding. This processing may include:

i) Severe quantisation of the error images: typically to 3 values $\{-\delta, 0, \delta\}$ where $\delta$ is a parameter ($\delta=2$ in the preceding example)

ii) Deletion (i.e.: setting to zero) of spatially isolated non-zero pixel values. This can also substantially offset the impact of noise in the original image on the data compression.

iii) Random deletion of non-zero pixel values, the probability of deletion being a parameter.

The aim of this processing is to increase the data compression achieved by the encoding technique whilst minimising the impact on the subjective quality of the reconstructed image sequence. The parameters of this processing are subject to adaptive control by the status of the output buffer of the compressor; the details of this control may vary between the levels of the pyramid.

The prediction rule data, which typically is smaller in volume, may also be encoded. Here, stationary matches may play a similar role to the zeros in the error image pixel values. There is, however, no analogy to the error image processing, and any adaptive control would relate to thresholds for switching between prediction rules.

The importance of adaptive controls governed by the status of the output buffer is to enable the most essential information to be retained during high image sequence activity while allowing increasingly more detailed information to be retained at lower activities.

Figure 4:
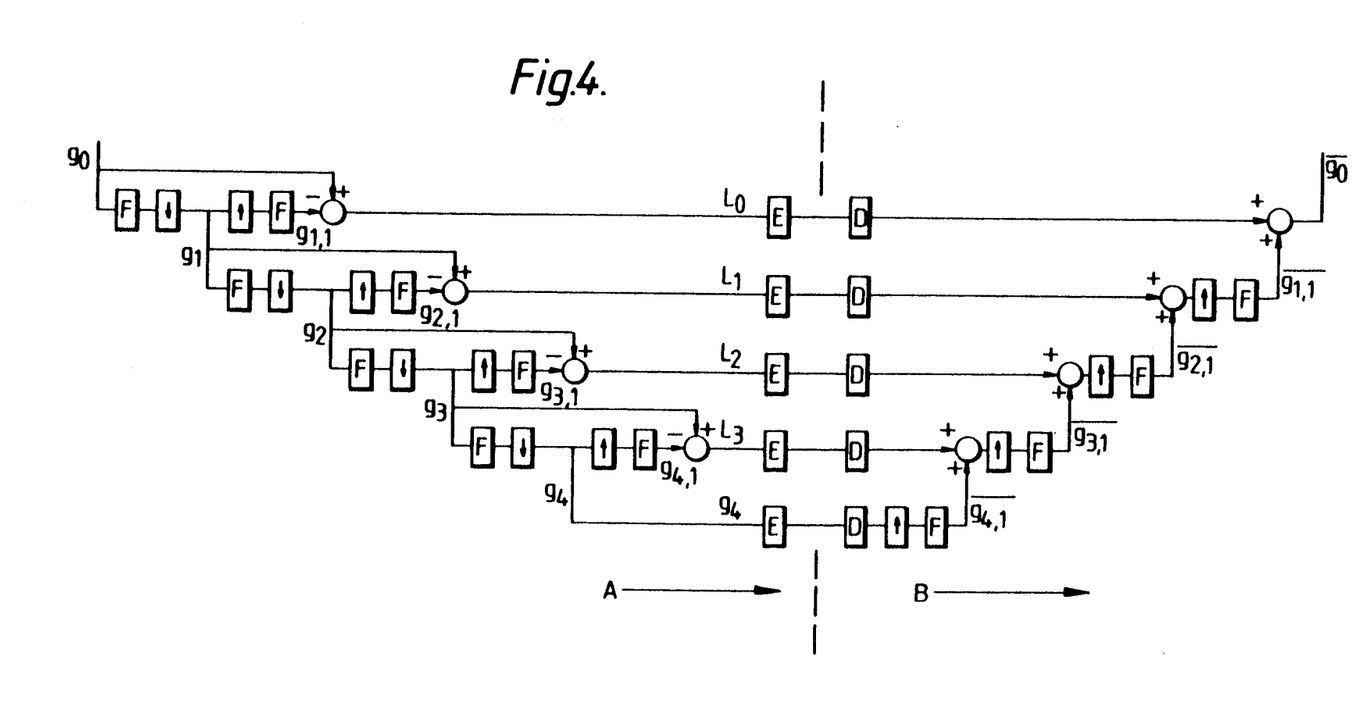
FIG. 4 is a block diagram representation of sub-band encoding and decoding for the image $g_o$ as utilised in the method of the invention.
Figure 5:
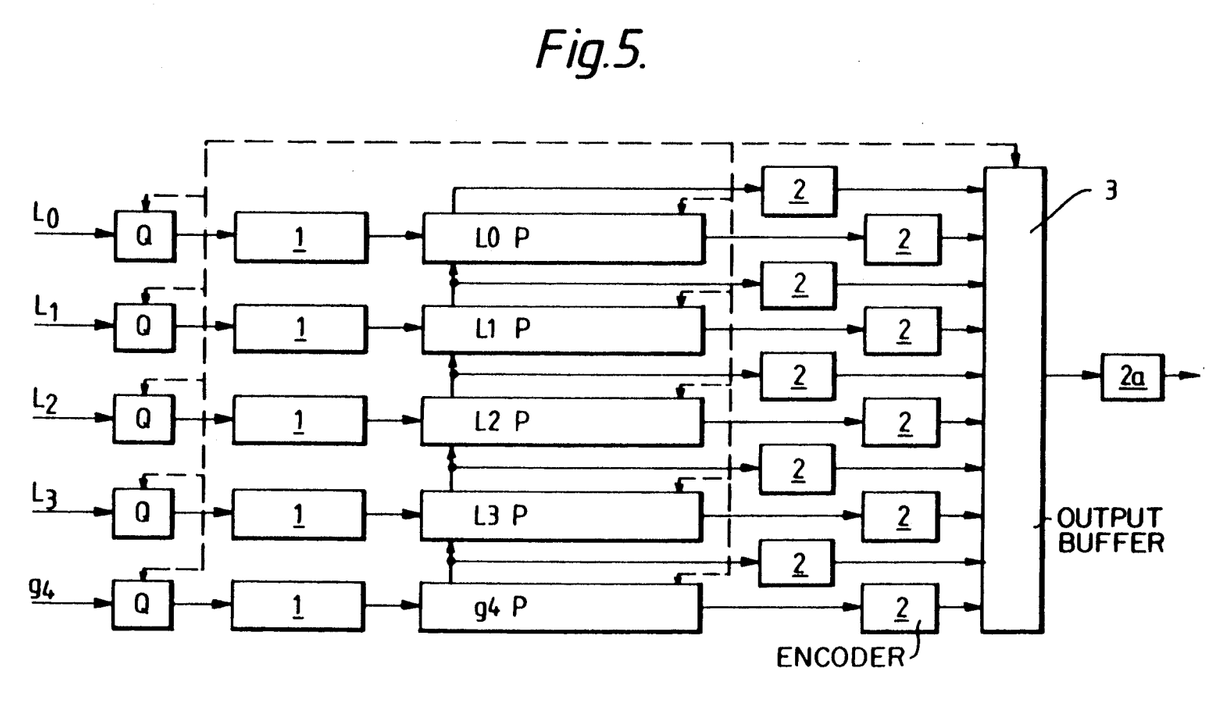
FIG. 5 is a block diagram of sub-band prediction and encoding for the image as utilised in the method of the invention.
Figure 7:
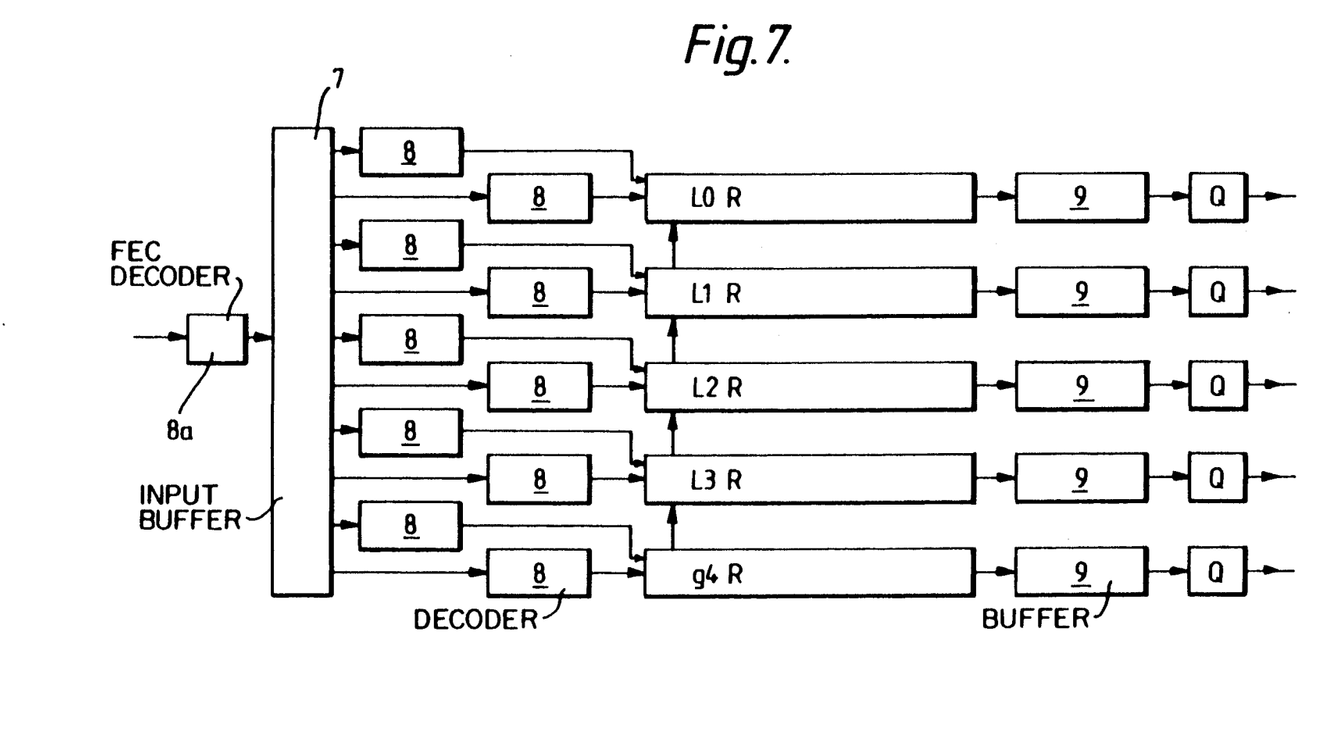
FIG. 7 is a schematic block diagram representation of recovery of sub-images from the fully compressed image data for use in the method of the present invention.

In FIG. 4 sub-band decomposition up to $g_4$ with prediction/encoding is shown on the left hand side A and reconstruction, as will later be described with reference to FIG. 7, is shown on the right hand side B. Thus the left hand side A of FIG. 4 is equivalent to FIG. 3. The block diagram of FIG. 5 shows sub-band prediction and encoding in which data from the levels $L_0$–$L_3$ and $g_4$ is fed to Quantizers Q and from thence via buffers 1 to associated predictors $L_0P$ to $L_3P$ and $g_4P$. From thence the data is passed via encoders 2 to an output buffer 3 for subsequent passage to storage or transmission via a forward error correction 2a.

Figure 6:
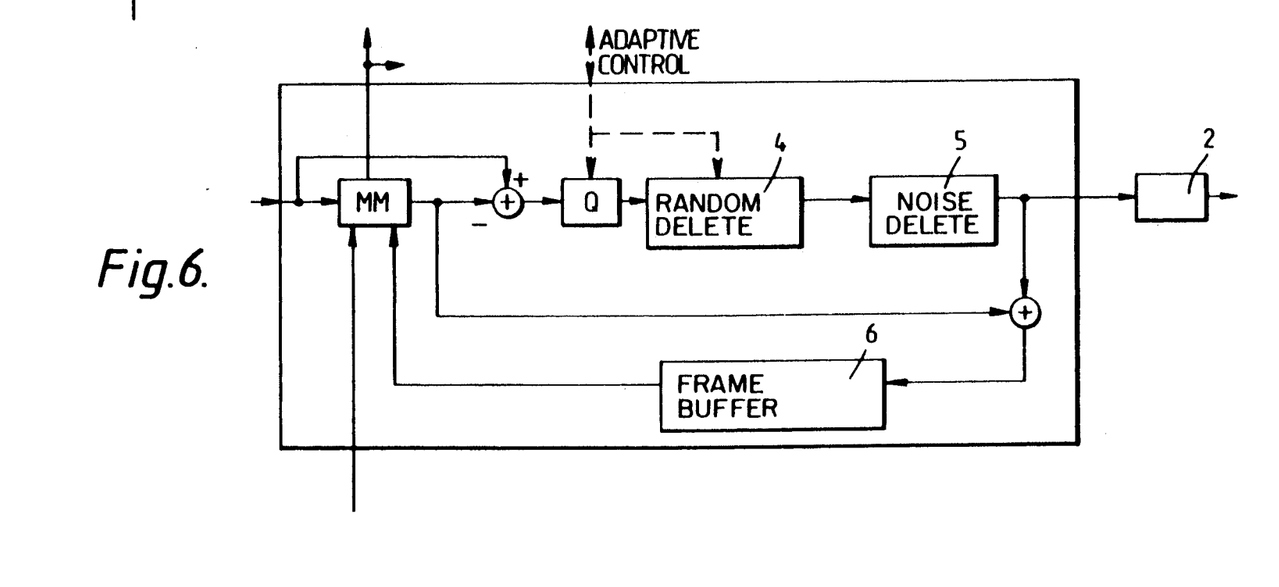
FIG. 6 is a schematic block diagram representation of predictors for use in the prediction step of FIG. 5.

In FIG. 6, is shown in block from the bandpass (Laplacian) predictors for FIG. 5. After motion match MM, the resulting predicted image is subtracted (pixel-by-pixel) from the image input to MM, to form an error image. These error images, together with motion prediction rules, enable the receiver to reconstruct the sequence of video images. The error images are sparse (i.e.: consist mainly of zeros) and contain pixels chosen from a very small symbol set. In order to obtain the maximum compression, it is necessary to represent the error images using as few bits as possible. This is the function of the coders 2 near the right hand side of FIG. 5.

The error images have some 2-dimensional (2-D) structure, that is they have non-zero pixel positions which are correlated with each other, and this makes additional decreases in bit rate possible. However, this 2-D structure is obscured in the raw error images by noise, and is difficult to take advantage of because run-length encoding is naturally 1-D. These drawbacks are overcome by pre-processing the error images before coding. Noise is deleted by setting isolated non-zero pixels to zero, via a quantizer Q, random deletion at 4, and noise deletion 5. This pre-processing must be done in the predictor before adding the error images to the predicted images prior to storing in the previous frame buffers 6.

The use of run length coding will produce data at a variable data rate. Since the channel rate is typically fixed, some form of buffering is required. In order to prevent the buffer memory from underflowing or overflowing the coding parameters are changed dynamically according to both the buffer memory occupancy and the local picture properties. This results in a multi-mode operation. The task of the adaptive control laws involves optimisation of the coding parameters in different modes and the mode transition strategy to provide appropriate picture quality as described earlier. A representative training sequence of images is used to determine the optimum parameter values.

To this end, prior to passage or transmission of fully compressed current frame image data to storage or to a receiver, the total number of bits of fully compressed data is counted, and if the total number falls outside a predetermined range, the total number of bits of the fully compressed data for the next current frame image is varied accordingly.

There can be a certain amount of overhead information to be stored or transmitted for the decoder or receiver to follow this adaptive strategy. The information may include:

Indicator to the quantisation lookup tables in use,

An overflow flag indicating incomplete transmission of full set of sub-band errors.

Note that to achieve further data compression the prediction rule information can be sent as differences from the rules used in the previous frame. In either case the data can be sent in run-length encoded format.

RECONSTRUCTION

This produces an approximation to the original image sequence from the compressed data either after reception for transmitted data or after retrieval for stored data. The approximation to each sub-image of the current frame image available for reconstruction is the sum of the predicted sub-image and corresponding processed error image. This is also stored at the compressor for use in the predictive coding of the next frame image in the sequence. Reconstruction comprises the following steps for each image:

i) The prediction rules, with associated parameters, and the processed error images are decoded from their encoded forms.

ii) The approximation to each sub-image is recovered by applying the prediction rules and parameters to the corresponding approximation recovered for the preceding image (for the initial image in any sequence, a standard preceding image, e.g.: blank, will be defined) and adding the respective error image pixel values.

iii) The sub-band decomposition of the original image is then inverted by increasing the number of pixels in the recovered lowpass (Gaussian) sub-image by a factor of two in each dimension using the filtering interpolation procedure of equation (2) above.

adding the pixel values of the smallest recovered bandpass (Laplacian) sub-image to produce an approximation to the lowpass image for that level in the pyramid.

These two steps are then repeated for each consecutive level in the pyramid (in the direction of increasing sub-image size) until an approximation to the original image is recovered. The total number of filtering operations is just half that of the sub-band decomposition because the latter also includes the reconstruction filtering in the course of ensuring that the reconstruction will be exact up to quantisation and error image processing effects.

In addition to the basic reconstruction procedure described above, there may be image enhancement post-processing which may be of particular relevance when the data compression requirement is severe.

Figure 8:
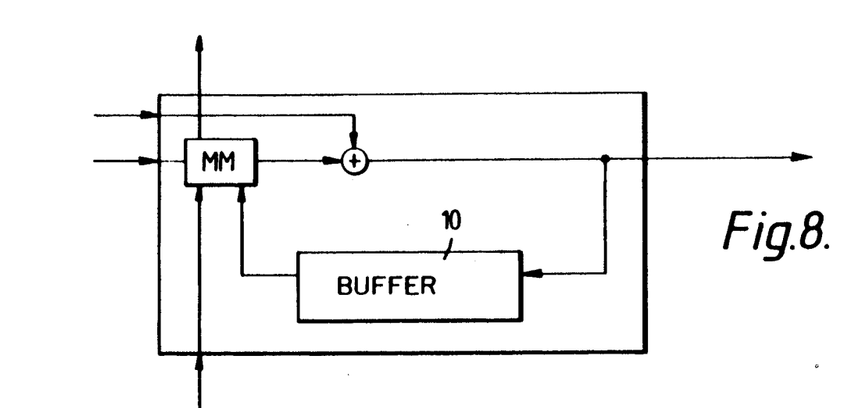
FIG. 8 is a schematic block diagram representation of reconstructors for use in the reconstruction step of FIG. 7.

In FIGS. 7 and 8 is shown the reconstruction step in block diagrammatic form for a sub-band decomposition up to $g_4$. The $L_0$ to $L_3$ bandpass images and $g_4$ are reconstructed, and then the final image $g_0$ is reconstructed from these sub-images as in part B of FIG. 4. The incoming encoded data is FEC decoded at 8a and stored in an input buffer 7.

The input buffer 7 receives data at a constant rate, which comprises unequal blocks of data describing successive frames. Each block of data must be processed in the frame period $T_f$. The data must be available in the buffer 7 at the required time. This data is then decoded by the decoders 8 and passed to the set of reconstructors $L_0R$, $L_1R$, $L_2R$, $L_3R$ and $g_4R$. The data for a given frame comprises the prediction rules, associated parameters, the error images and may also include the quantizations and thresholds used within the compression. Consider reconstruction applied to frame N $L_0$ to $L_3$ and $g_4$ corresponding to frame N-1 are assumed to be stored in buffers 10 (see FIG. 8).

The available data on $g_4(N)$ comprises prediction rules, including displacement vectors, etc, for the blocks into which it has been sub-divided and the $\Delta g_4(N)$ error image in processed and encoded form.

The prediction $g'_4(N)$ of $g_4(N)$ is derived from $g_4(N-1)$ using the prediction data, and $\Delta g_4(N)$ is decoded to recover the processed error image on a pixel basis. $\Delta g_4(N)$ is added to the prediction $g'_4(N)$ to form $g_4(N)$.

$L_3(N)$ is similarly decoded to yield the error image on an individual pixel basis. The prediction rule data relating to $L_3$ comprises the displacement vectors for the blocks into which it was sub-divided and is used to construct the prediction of $L_3(N)$, $L'_3(N)$, from the stored $L_3(N-1)$. $\Delta L_3(N)$ is then added to $L'_3(N)$ to produce $L_3(N)$.

This procedure is similarly followed for $L_2$, $L_1$ and $L_0$. Note that, if motion information transfer down the pyramid is implemented, then the full displacement vectors are formed by combining the relative displacement vectors in the prediction rule data with the full displacement vectors established for the corresponding blocks in the next higher level in the pyramid.

The $g_4(N)$ and $L_0(N)$ to $L_3(N)$ images formed in this way are exactly as stored in the previous frame buffers 6 at the transmit/store end (although they only approximate the original $g_4(N)$, $L_i(N)$). These images replace the (N-1)-images in the previous frame buffers 10 ready for the next frame.

The $g_4(N)$ and $L_0(N)$ to $L_3(N)$ images are then passed to quantizers Q via the buffers 9, where they are requantized to the original number of levels (bits) prior to pyramid reconstruction. Pyramid reconstruction involves the following steps:

a) The received $g_4$ is interpolated and filtered to produce $g_{4,1}$. This filtering is identical to that used in compression to produce $g_{4,1}$ from $g_4$, b) The Laplacian $L_3$ is added to $g_{4,1}$ to produce $g_3$, c) $g_3$ is interpolated and filtered to produce $g_{3,1}$, d) $L_2$ is added to $g_{3,1}$ to produce $g_2$, e) This procedure is followed down the pyramid to produce $g_0$, the (approximate) reconstruction of the original image.

The filtering requirements at the receive/retrieve end are therefore approximately half of those at the transmit/store end.

The method of the invention may be put into effect using any suitable apparatus. In such apparatus, in order to prevent the buffer memory from underflowing or overflowing the quantisation tables on the individual sub-bands, and in particular on the errors associated with their predictive coding, are changed dynamically according to both the buffer memory occupancy and local picture properties. When the output buffer 3 begins to overflow, error image quantisation may be made more coarse to reduce the prediction errors. Similarly underflow of the buffer may result in a finer quantisation. Each sub-band has a number of pre-assigned lookup tables which can be used for quantisation, these have been optimised from a representative sequence of training images. The control laws designate which table is to be used on each sub-band in any instance. In addition, a proportion of the non-zero pixels may be randomly deleted from the prediction error images to prevent buffer overflow.

The method of the invention has been described above, for brevity, in terms of a single scalar value for each pixel of each image in the sequence, e.g.: monochrome TV. Of course the method of the invention may extend to more complex applications such as colour TV where the initial data has three components. These may be chosen as one luminance and two chrominance signals and they may be digitised at different rates with the chrominance signals typically being sub-sampled relative to the luminance. The three components would be processed independently in respect of sub-band decomposition, predictive coding, encoding and reconstruction, except that the prediction rules for all three components may be determined by the luminance data alone and the encoding and decoding of the error images, and the various adaptive controls, may operate on the components in combination.

The large compression ratios obtainable by the method and apparatus of the invention arise from the redundancy between and within images, from the dispersal of errors over different length scales and from tailoring the algorithm to human visual response.

Various modifications and alterations may be made to the embodiments of the present invention described and illustrated, within the scope of the present invention as defined in the following claims.

What is claimed is:

1. A method of processing video image data for use in the storage or transmission of moving digital video images, comprising the steps of:

decomposing each frame image into an equivalent set of sub-images containing information on different length scales, deriving encoded prediction rules from the sub-images decomposed in said decomposing step;

approximating each sub-image using data from the immediately preceding compressed sub-image and data from the current sub-image to produce compressed data of an image for subsequent storage or transmission to a receiver; and reconstructing de-compressed current frame data, after retrieval or receipt, by comparison of the compressed data received for the current frame image with a reconstruction of the preceding frame image.

2. A method of processing video image data for use in the storage or transmission of moving digital video images, including the steps of examining a current frame image, sub-band decomposing the current frame image by bandpass filtering to produce a set of sub-images, dividing each sub-image in the current frame image set into a plurality of blocks, comparing the blocks for each sub-image in the current frame image set with the blocks in the approximation of the corresponding sub-image in the preceding frame image set for similarities and variations in illumination intensity, generating for each block of each sub-image of the current frame image set a prediction rule and errors resulting therefrom to produce for each sub-image of the current frame image partially compressed data which is the sum of the predicted sub-image and corresponding error image, and further compressing the partially compressed data for each sub-image of the current frame image by encoding to produce fully compressed current frame image data, for subsequent passage or transmission to storage or a receiver and reconstruction of the retrieved or received fully compressed current frame image data.

3. A method according to claim 2, in which sub-band decomposition is an iterative operation carried out more than once, with each successive bandpass sub-image being generated at each iteration and containing information from the upper half of the remaining spatial frequency spectrum in each dimension.

4. A method according to claim 3, in which the set of bandpass sub-images is completed by a final lowpass sub-image containing information from the whole of the remaining spatial frequency spectra.

5. A method according to claim 4, in which the first bandpass sub-image has the same number of pixels as the current frame image, with each successive sub-image being sub-sampled by a factor of two in each dimension relative to the previous sub-image.

6. A method according to claim 5, in which before subsequent processing the sub-band decomposition is exactly invertible so that the current frame image is recoverable without error from the set of sub-images.

7. A method according to claim 6, including the step of quantizing the pixel values of the sub-images.

8. A method according to claim 7, wherein the prediction rule for each block of each sub-image of the current frame image involves 'stationary match' in which a block is sufficiently similar to the spatially coincident block in the approximation of the corresponding preceding frame sub-image or 'displaced match' in which a block is sufficiently similar to a block displaced from the spatially coincident block in the approximation of the corresponding preceding frame sub-image or 'mean value' in which the pixel values of a block are estimated by the average of those values or 'intraframe' in which each pixel value in a block is estimated on the basis of the approximations of neighbouring pixel values in the current frame sub-image.

9. A method according to claim 8, in which the prediction rule for each block of each sub-image of the current frame image includes predictions for the pixel values of the block in the form of the spatially coincident values from the approximation of the corresponding preceding frame sub-image or the appropriately displaced values or the average of the pixel values in the current frame sub-image block or the interpolations of the approximations for neighbouring pixel values in the current frame sub-image.

10. A method according to claim 9, in which the errors for each block of each sub-image of the current frame image are the differences between the pixel values of the actual and predicted current frame sub-image block.

11. A method according to claim 10, in which before encoding the errors are processed by quantisation, deletion of spatially isolated non-zero values and/or random deletion of non-zero values, further to increase the data compression effect resulting from subsequent encoding.

12. A method according to claim 11, in which prior to passage or transmission of fully compressed current frame image data to storage or to a receiver, the total number of bits of fully compressed data is counted, and if the total number falls outside a predetermined range, the total number of bits of the fully compressed data for the next current frame image is varied accordingly.

13. A method according to claim 12, including the steps of passage or transmission of fully compressed current frame image data to storage or a receiver, and reconstruction of the retrieved or received fully compressed current frame image data, in which reconstruction the prediction rules and processed error images are decoded, the approximations to each of the sub-images are recovered and the sub-band decomposition of the original current frame image is inverted.

14. A method according to claim 13, in which the approximations to each of the sub-images are recovered by applying the prediction rules to the corresponding approximations recovered for the immediately preceding frame image and adding the respective error image pixel values thereto.

15. A method according to claim 13, in which the sub-band decomposition is inverted by increasing the number of pixels in the recovered lowpass sub-image by a factor of two in each dimension, adding the pixel values of the smallest recovered bandpass sub-image to produce an approximation to the lowpass image for that level, and repeating said increasing and adding steps for each consecutive level in the current frame image sub-band decomposition until an approximation of the original current frame image is produced.

* * * * *